United States Patent
Alvarez et al.

(10) Patent No.: US 9,531,627 B1
(45) Date of Patent: Dec. 27, 2016

(54) SELECTING A REMOTE PATH USING FORWARDING PATH PREFERENCES

(71) Applicant: Cisco Technology, Inc., San Jose, CA (US)

(72) Inventors: Santiago Alvarez, Moutain View, CA (US); Sami Boutros, Dublin, CA (US); Syed Kamran Raza, Kanata (CA)

(73) Assignee: Cisco Technology, Inc., San Jose, CA (US)

( * ) Notice: Subject to any disclaimer, the term of this patent is extended or adjusted under 35 U.S.C. 154(b) by 122 days.

(21) Appl. No.: 14/155,769

(22) Filed: Jan. 15, 2014

(51) Int. Cl.
*H04L 12/723* (2013.01)

(52) U.S. Cl.
CPC ................... *H04L 45/507* (2013.01)

(58) Field of Classification Search
CPC ........................................................ H04L 45/507
See application file for complete search history.

(56) References Cited

U.S. PATENT DOCUMENTS

| | | | |
|---|---|---|---|
| 2002/0194368 A1* | 12/2002 | Kon ...................... | H04L 45/00 709/238 |
| 2006/0153187 A1* | 7/2006 | Agrawal et al. .............. | 370/389 |
| 2009/0092140 A1* | 4/2009 | Gibbons et al. ......... | 370/395.31 |
| 2013/0223454 A1* | 8/2013 | Dunbar et al. ................ | 370/400 |

OTHER PUBLICATIONS

Cisco, "Advanced Topics in MPLS-TE Deployment", White Paper, dated 2009, 30 pages.
Cisco Press, "Internetworking Technologies Handbook", Fourth Edition, dated Sep. 11, 2003, 1321 pages.
Cheung, Yinglarn, "Mufti-Protocol Label Switching (MPLS)", Using MPLS to Build an Application-Centric Network, dated May 2003, 12 pages.

* cited by examiner

*Primary Examiner* — Hoon J Chung
*Assistant Examiner* — Zhensheng Zhang
(74) *Attorney, Agent, or Firm* — Hickman Palermo Becker Bingham LLP

(57) ABSTRACT

Selecting remote path using forwarding path preferences is disclosed. In an embodiment, a message of a first network node identifying one or more forwarding path preferences in association with one or more destination addresses is received at a packet router. A particular path corresponding to a particular forwarding path preference from among the one or more forwarding path preferences received in the message is determined and in response a particular label is determined. A forwarding entry associating the particular label with the particular forwarding path preference and the particular path is stored. The particular label is forwarded to a second network node. A packet including the particular label is received at the packet router and the particular path associated with the particular label included with the packet is selected based on the forwarding entry associated with the label. The packet is forwarded to a network node via the selected path.

20 Claims, 7 Drawing Sheets

SELECTING A REMOTE PATH USING FORWARDING PATH PREFERENCES

TECHNICAL FIELD

The present disclosure generally relates to routing packets in telecommunications network. The disclosure relates more specifically to techniques for selecting a network path for forwarding packets.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Two responsibilities of operators of telecommunications networks are ensuring optimal usage of network resources and meeting performance expectations of network users. Network operators ensure optimal usage of their network resources and meet performance expectations of network users by deploying traffic engineered paths in their network. Typically, network operators have two choices when deploying traffic engineered paths. One choice is to deploy traffic engineered paths between edge routers of the network. Another choice is to deploy traffic engineered paths between core routers of the network.

Deploying traffic engineered paths between edge routers allows the network operator to control the network traffic that will be routed to particular traffic engineered paths, but such deployment typically results in a high number of traffic engineered paths and the network operator quickly confronts scalability issues. On the other hand, opting to deploy traffic engineered paths between core routers results in smaller number of traffic engineered paths and allows the network operator to satisfactorily handle scalability issues. However, deploying traffic engineered paths between core routers does not provide the network operator with any control in routing certain network traffic to particular paths. Therefore, a network operator must always choose between greater control over routing certain traffic to particular traffic engineered paths and avoiding scalability issues by deploying smaller number of traffic engineered paths.

DESCRIPTION OF EXAMPLE EMBODIMENTS

Figure 1:
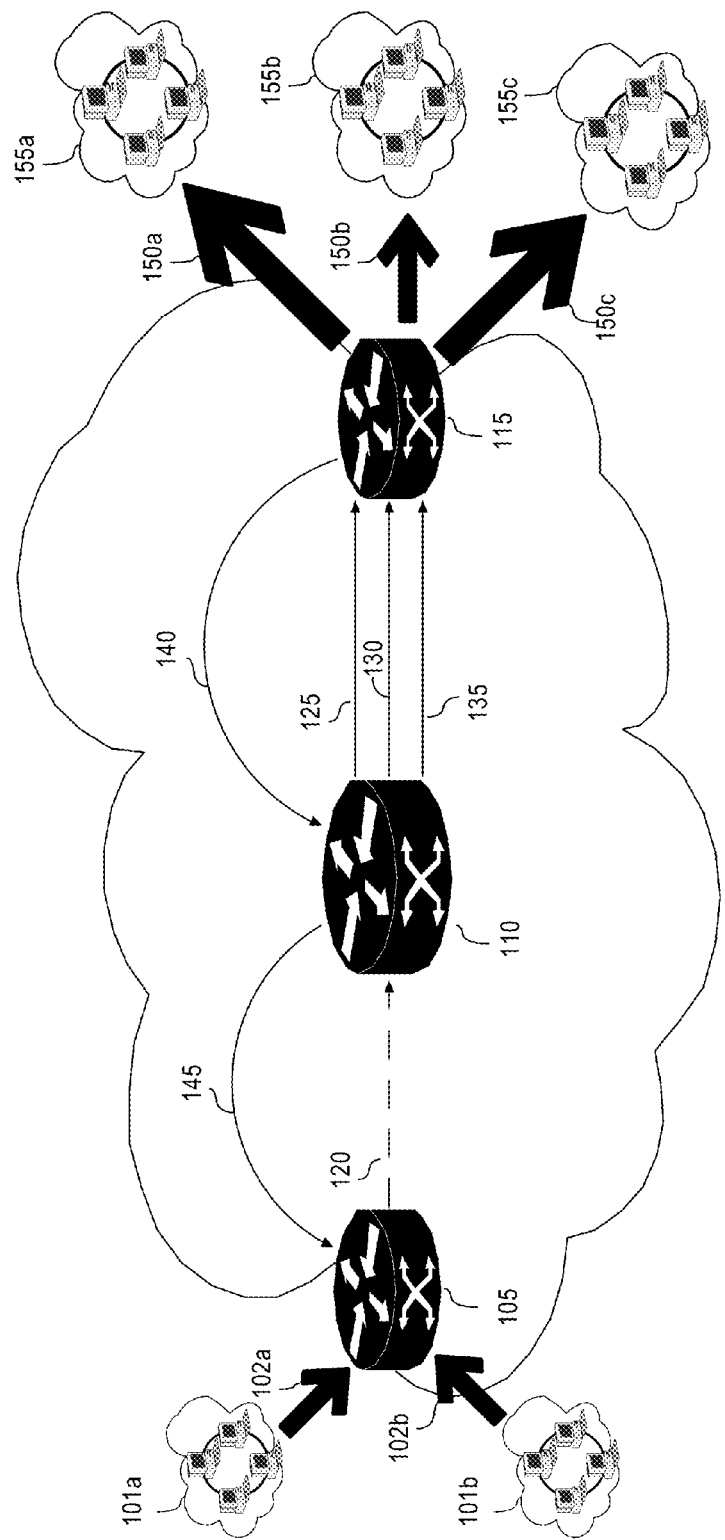
FIG. 1 illustrates an example networking arrangement implementing remote path selection.

Selecting a remote path using forwarding path preferences is described. In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

Embodiments are described herein according to the following outline:

1.0 Overview
2.0 Structural and Functional Overview
3.0 Method of Selecting a Remote Path Using Forwarding Path Preferences
4.0 Implementation Mechanisms—Hardware Overview
5.0 Extensions and Alternatives 1.0 Overview In an embodiment, a method is described for selecting a remote path in a network for a certain type of traffic. In an embodiment, a message of a first network node identifying one or more forwarding path preferences in association with one or more destination addresses is received at a packet router. A particular path corresponding to a particular forwarding path preference from among the one or more forwarding path preferences received in the message is determined and in response a particular label is determined. A forwarding entry associating the particular label with the particular forwarding path preference and the particular path is stored. The particular label is forwarded to a second network node. A packet including the particular label is received at the packet router and the particular path associated with the particular label included with the packet is selected based on the forwarding entry associated with the label. The packet is forwarded to a network node via the selected path.

In other embodiments, the disclosure encompasses a data processing system, a computer apparatus and a computer-readable medium configured to carry out the foregoing steps.

2.0 Structural and Functional Overview

In an embodiment, a message, identifying one or more forwarding path preferences associated with one or more node addresses, is received at a midpoint network node, such as a core router or a network backbone router, which comprises logic configured to manage selection of a path associated with the midpoint network node by an ingress network node. A particular path, from a set of paths associated with the midpoint network node, corresponding to one or more forwarding path preferences received in the message is determined, based on an analysis of one or more mappings of paths and forwarding path preferences. A particular label is determined for each of the forwarding path preferences with a corresponding particular path. A forwarding entry associating the particular label with the forwarding path preference and the corresponding path is stored. The particular label is forwarded towards an ingress network node. A packet that includes the particular label is received at the midpoint network node. The path associated with the particular label and corresponding to the forwarding path preference associated with the particular label is selected, based on an analysis of the particular label, the stored forwarding entry and the forwarding path preference associated with the particular label; thereby allowing the ingress network node, which associated the particular label with the packet, to determine a path, which is remote to the ingress network node, to be selected at the downstream midpoint network node. Packets are forwarded towards an egress network node via the selected path.

Certain embodiments are configured to help reduce or eliminate costs associated with retaining greater control over routing certain traffic to particular paths and/or avoiding scalability issues by deploying smaller number of traffic engineered paths. In an embodiment, by utilizing remote path selection logic, computers associated with a network operator may deploy traffic engineered paths only between core routers and continue to maintain control over routing certain traffic to particular traffic engineered paths at the ingress edge router. Thus the network operator may obtain certain benefits and reduce or avoid certain costs associated with deploying traffic engineered paths only between core routers and retaining control over routing certain traffic to particular traffic engineered paths.

As described herein, a traffic engineered path may be any type of a communication path in a telecommunications network, such as data link, Generic Routing Encapsulation (GRE) tunnel, Internet Protocol Security (IPSec) tunnel, Label Distribution Protocol (LDP) path, Segment Routing traffic engineered path, Multiprotocol Label Switching (MPLS) traffic engineered path.

For purposes of illustrating a clear example, assume that a network has four routers comprising two edge routers denoted E1 and E2 and two core routers denoted C1 and C2, where E1 is the ingress edge router and E2 is the egress edge router for packets flowing from E1 to E2. The network operator may desire to traffic engineer certain paths in the network for low latency to ensure timely delivery of packets related to certain services that are highly sensitive to packet latency. The network operator may also desire to avoid any scalability issues that a growing network may face in the future and therefore may desire to deploy a small number of traffic engineered paths. However, since the network operator must ensure that packets related to certain services must be routed to particular paths that have been traffic engineered for low latency, losing control over routing certain network traffic to particular traffic engineered paths is highly undesirable.

In an embodiment, the network operator may deploy certain traffic engineered paths only between core routers, C1 and C2 and implement remote path selection logic at egress edge routers E1 and E2 and at the core router C1. A particular traffic engineered path, at core router C1, may be associated with a particular identifier, referred to herein as a forwarding path preference. The forwarding path preference is a unique global identifier in the network. In some embodiments, multiple traffic engineered paths may be associated to a particular forwarding path preference.

The egress edge router E2 may send a message identifying one or more forwarding path preferences, which is propagated throughout the network. Once the message reaches core router C1, core router C1 may then determine if one or more paths associated with C1 are associated with any of the forwarding path preferences identified in the message and forward a forwarding path preference label associated with the forwarding path preference to the ingress edge router E1. The ingress edge router E1, for each packet received at the ingress edge router E1 that is destined towards egress edge router E2, associates one of the received forwarding path preference labels with the packet, based on an analysis of a forwarding policy associated with E1, and forwards the packet to the core router C1. Core router C1 receives the packet and selects the path corresponding to the forwarding path preference associated with the received packet's forwarding path preference label. The Core router C1 may then forward the packet towards its destination address via the selected path. Therefore, through the forwarding policy and association of particular forwarding path preference label with a particular packet, control over routing certain network traffic to particular traffic engineered paths, while deploying only a small number of traffic engineered paths between core routers, is retained.

The foregoing operations are described further herein in connection with FIG. 1 and the other drawings.

FIG. 1 illustrates an example networking arrangement that depicts a network comprising an ingress network node, midpoint network node and an egress network node. A network node, in this context, may be an electronic digital data processing device configured as an element of internetworking infrastructure, such as a router or switch or other computing devices that include routing and switching logic.

In this example, network node 105 is an ingress edge router for packets entering the network from network nodes 101a, 101b via paths 102a, 102b. Network node 110 is a core router or a backbone router of the network and may also be referred to herein as the midpoint network node, and network node 115 is an egress edge router for network nodes 155a, 155b, 155c.

The ingress edge router 105 is aware of one path 120 that may be used to forward packets to the egress edge router 115. The midpoint network node 110 is aware of paths 125, 130, 135 that may be used to forward packets to the egress edge router 115. Paths 125, 130, 135 may be any type of traffic engineered paths. Path 150a may be used to forward packets with destination address belonging to one of the network nodes in the set of network nodes 155a. Path 150b may be used to forward packets with destination address belonging to one of the network nodes in the set of network nodes 155b and similarly path 150c may be used to forward packets to a network node in the set of network nodes 155c.

In an embodiment, ingress network node 105, midpoint network node 110 and egress network node 115 may be configured with remote path selection logic. Midpoint network node 110 may be further configured with one or more mappings of forwarding path preferences and paths 125, 130, 135. Reference numeral 145, based on the particular routing protocol or label switching protocol used to advertise or otherwise transmit messages between network nodes in the network, in some embodiments, may represent one or more forwarding path preference labels or a message comprising of at least one or more forwarding path preference labels or one or more messages, each message comprising of at least one or more forwarding path preference labels. The forwarding path preferences may be unique global values, such that each of the values indicates only a particular forwarding path preference and does not represent any other attribute for any network node throughout the network. Midpoint network node 110 may also be configured to forward a particular forwarding path preference label (reference numeral 145) for each forwarding path preference associated with one or more of paths 125, 130, 135.

The egress network node 115 may be configured with one or more mappings of forwarding path preferences and IP prefixes representing sets of network node addresses belonging to egress network node 115, such as loopbacks, or learned IP prefixes, for example, IP prefixes representing network node addresses of network nodes belonging to network node sets 155a, 155b, 155c, for which the egress network node 115 is the egress edge router in the network. Typically egress network node 115 would advertise a forwarding path preference for its own loopback, and destinations in network node sets 155a, 155b, 155c would benefit via recursive resolution of BGP routes. The egress network node 115 may be further configured to select one or more forwarding path preferences and advertise or otherwise transmit a message 140 identifying one or more forwarding path preferences towards the ingress network node 105.

The ingress network node 105 may be configured to store forwarding path preference labels (reference numeral 145) received from midpoint network node 110. The ingress network node 105 may be further configured with a particular forwarding policy that may specify a particular forwarding path preference based on certain attributes associated with an incoming packet. As described herein, a forwarding policy may be a set of rules stored in computer memory that may be control plane, data plane or management plane driven. A control plane driven forwarding policy may specify a forwarding path preference based on information related to control plane architecture of the network node. For example, the forwarding policy associated with the ingress network node 105 may specify a particular forwarding path preference for all packets with a destination address belonging to a VPNv4 address family. A data plane driven forwarding policy may specify a forwarding path preference based on a value in one or more fields of a packet. For example, the forwarding policy associated with the ingress network node 105 may specify a particular forwarding path preference for packets with a particular Expedited Forwarding (EF) value in the Differentiated Services field of the packet. A management plane driven forwarding policy may specify a forwarding path preference based on information related to management plane of the communication architecture of the network node. For example, the forwarding policy associated with the ingress network node 105 may specify a particular forwarding path preference based on information related to connectivity of paths to other network nodes in the network.

The ingress network node 105 may be configured to determine the forwarding path preference associated with each of the forwarding path preference labels (reference numeral 145) received from midpoint network node 110, and select one of the forwarding path preference labels (reference numeral 145), based on the particular forwarding path preference specified by the forwarding policy associated with the ingress network node 105. The ingress network node 105 may associate the incoming packet with the selected forwarding path preference label and forward the packet via path 120 to midpoint network node 110. Midpoint network node 110 may select the path corresponding to the forwarding path preference associated with the forwarding path preference label, included in the packet received from ingress network node 105, and forward the packet via the selected path.

Thus, a remote path associated with a downstream network node is selected by ingress network node 105, by associating a particular forwarding path preference label with a particular packet, based on a forwarding policy associated with the ingress network node. Therefore, a network operator is able to retain control over routing particular traffic to particular paths while avoiding scalability issues by only deploying traffic engineered paths at a core router.

Figure 2:
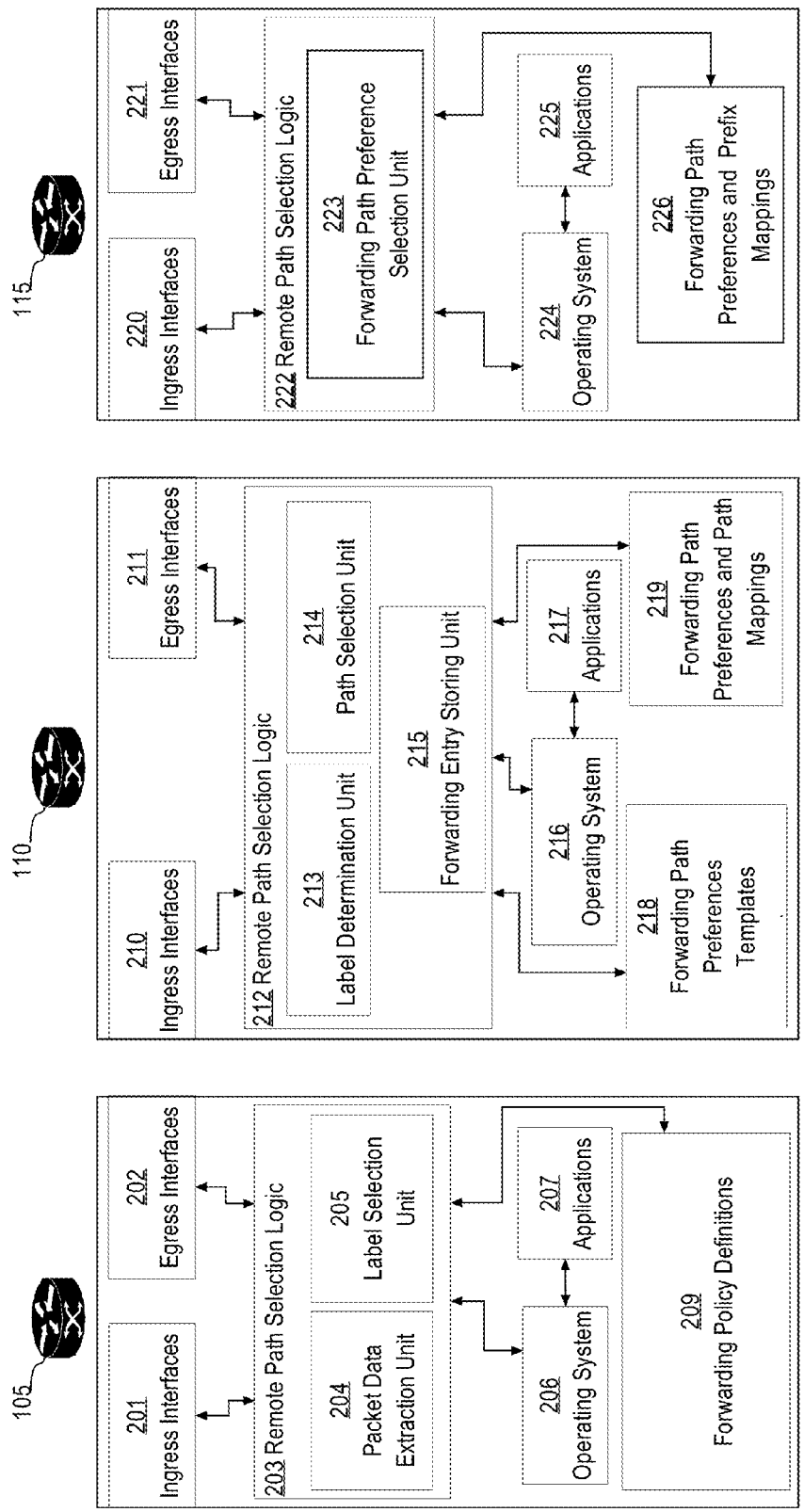
FIG. 2 illustrates functional logic of an embodiment as implemented in a router.

FIG. 2 illustrates functional logic of an embodiment as implemented in ingress, midpoint and egress network nodes of a network.

In an embodiment, ingress network node 105 may comprise remote path selection logic 203 coupled to one or more ingress interfaces 201 and one or more egress interfaces 202. At ingress network node 105, packet flows and network node messages may be received at one or more of the ingress interfaces 201 and forwarded using one or more of the egress interfaces 202. In an embodiment, remote path selection logic 203 at the ingress network node 105 comprises a packet data extraction unit 204 and a label selection unit 205. In an embodiment, the packet data extraction unit 204 is configured to copy or read data values in headers of packets received on one or more ingress interfaces 201 for use in forwarding path preference label selection decisions, as further described herein. In an embodiment, label selection unit 205 is configured to select forwarding path preference labels based on the data obtained from packet data extraction unit 204 and forwarding policy definitions 209. In an embodiment, label selection unit 205 may be configured to select forwarding path preference labels based on routing information associated with the destination address of the packet. Using these approaches, the forwarding path preference label can be driven by the data plane or control plane. These operations are described further herein in connection with FIG. 3 and other drawings.

In an embodiment, remote path selection logic 203 at the ingress network node 105 is coupled to or can access and store forwarding policy definitions 209. In an embodiment, each of the forwarding policy definitions 209 may be stored in non-volatile memory or volatile memory of the ingress network node 105.

In an embodiment, midpoint network node 110 may comprise remote path selection logic 212 coupled to one or more ingress interfaces 210 and one or more egress interfaces 211. At midpoint network node 110, packet flows and network node messages may be received at one or more of the ingress interfaces 210 and forwarded using one or more of the egress interfaces 211. In an embodiment, remote path selection logic 212 comprises a label determination unit 213, path selection unit 214, forwarding entry storing unit 215. In an embodiment, the label determination unit 213 is configured to read values in a network node message, received on the one or more ingress interfaces 210, for use in determining forwarding path preferences and a particular forwarding path preference label for each of the forwarding path preferences, as further described herein.

In an embodiment, the path selection unit 214 is configured to determine a particular path corresponding to a particular forwarding path preference, based on the one or more forwarding path preferences and path mappings 219. In an embodiment, the path selection 214 may be configured to instantiate a path corresponding to the determined forwarding path preference, using the forwarding path preferences templates 218, where a particular forwarding path preference has not been associated with a particular path at midpoint network node 110. In an embodiment, forwarding entry storing unit 215 is configured to associate a particular forwarding path preference label with a particular forwarding path preference and the particular path corresponding to the particular forwarding path preference. These operations are described further herein connection with FIG. 3 and other drawings.

In an embodiment, the remote path selection logic 212 is coupled to or can access and store forwarding path preferences templates 218 and forwarding path preferences and path mappings 219. In an embodiment, each of the forwarding path preferences templates and forwarding path preferences and path mappings may be stored in non-volatile memory or volatile memory of the midpoint network node 110.

In an embodiment, egress network node 115 may comprise remote path selection logic 222 coupled to one or more ingress interfaces 220 and one or more egress interfaces 221.

At egress network node 115, packet flows and network node messages may be received at the one or more ingress interfaces 220 and forwarded using the one or more egress interfaces 221. In an embodiment, remote path selection logic 222 comprises a forwarding path preference selection unit 223. In an embodiment, the forwarding path preferences selection unit 223 is configured to determine one or more forwarding path preferences for a prefix to which egress network node 115 is the egress edge router of the network, based on the forwarding path preferences and prefix mappings 226. These operations are described further herein connection with FIG. 3 and other drawings.

In an embodiment, remote path selection logic unit 222 is coupled to or can access and store forwarding path preferences and prefix mappings 226. In an embodiment each of the forwarding path preferences and prefix mappings 226 may be stored in non-volatile memory or volatile memory of the egress network node 115.

The remote path selection logic 203, 212, 222 may be coupled to operating system 206, 216, 224 and one or more other applications 207, 217, 225 that may implement internetworking functions. For example, applications 207, 217, 225 may implement Border Gateway Protocol (BGP), Label Distribution Protocol (LDP), Intermediate System to Intermediate System (IS-IS) routing protocol, Open Shortest Path First (OSPF) routing protocol or other routing protocols and label switching functions.

3.0 Method of Selecting a Remote Path Using Forwarding Path Preferences

Figure 3:
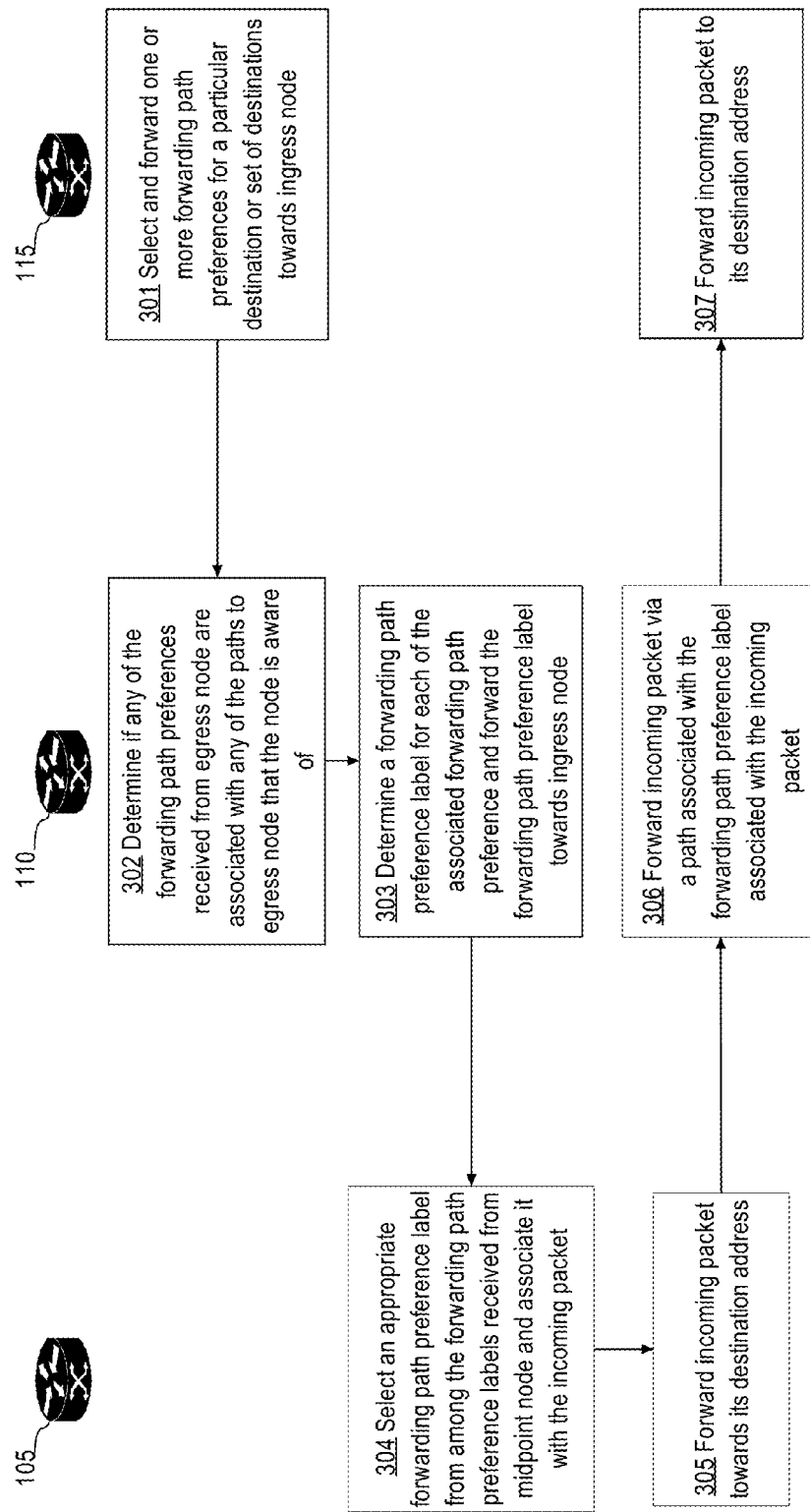
FIG. 3 illustrates a method for forwarding a packet via a particular remote path.

FIG. 3 illustrates an example method for forwarding a packet via a particular remote path. For purposes of illustrating a clear example, FIG. 3 is described in the context of specific nodes of the example network of FIG. 1. However, the approach functionally represented in the descriptions of process steps in FIG. 3 and the following sections may be adapted to or implemented in the context of other network configurations and are not limited to the specific context of FIG. 1; to apply FIG. 3 to such implementations, the specific references below to nodes 105, 110, 115, may be ignored.

In step 301, at egress network node 115, one or more forwarding path preferences are selected and forwarded towards ingress network node 105. In an embodiment the one or more forwarding path preferences are associated with a particular network node address or a prefix representing a set of network node addresses. In an embodiment the one or more forwarding path preferences are forwarded in a message associating the one or more forwarding path preferences with the particular network node address or the prefix. The particular format of the message may depend upon the particular routing or label switching protocol used to advertise or otherwise transmit messages between network nodes in the network. For example, if Border Gateway Protocol (BGP) is used to advertise messages between network nodes, then the message of the egress network node 115 identifying the one or more forwarding path preferences will be formatted according to BGP. Similarly if Label Distribution Protocol (LDP) is being used to transmit messages between network nodes, then the forwarding path preferences may be identified in a message formatted according to LDP, or if segment routing is being used to configure forwarding behavior in a network, then intermediate system to intermediate system (IS-IS) routing protocol or open shortest path first (OSPF) routing protocol may be used to format and forward the message identifying the forwarding path preferences.

In step 302, midpoint network node 110 determines whether the forwarding path preferences received from egress network node 115 are associated with any of the paths that midpoint network node 110 is aware of and can carry packet traffic to egress network node 115. Thus the midpoint network node 110 checks if a path to node 115 has a matching forwarding path preference.

In step 303, midpoint network node 110 determines a particular forwarding path preference label for each forwarding path preference associated with any of the paths that midpoint network node 110 is aware of and can carry packet traffic to egress network node 115—so that there is a matching forwarding path preference—and forwards the particular forwarding path preference label to the ingress network node 105. The format of the message distributing the particular forwarding path preference label may depend upon the particular routing or label switching protocol used by the network nodes to communicate with other network nodes in the network, such as BGP, LDP, IS-IS, OSPF.

In step 304, at ingress network node 105, a particular forwarding path preference label corresponding to a packet, received at ingress network node 105, is selected from among the forwarding path preference labels received at ingress network node 105 and associated with the packet, allowing ingress network node 105 to remotely select a particular path associated with midpoint network node 110. The particular manner of associating the forwarding path preference label with the packet depends upon the particular data plane architecture implemented at the various network nodes in the network. For example, a network node implementing a MPLS data plane may associate the forwarding path preference label with the packet similar to how a non-forwarding path preference LDP label is associated with a particular packet.

In step 305, the packet, associated with the corresponding forwarding path preference label, is forwarded to the midpoint network node 110. In step 306, at midpoint network node 110, the packet forwarded from the ingress network node 105 is received and forwarded via a path associated with the forwarding path preference label associated with the received packet.

In step 307, the packet forwarded from the midpoint network node 110 via the path remotely selected by the ingress network node 105 is received at egress network node 115, and forwarded to its destination address.

Figure 4:
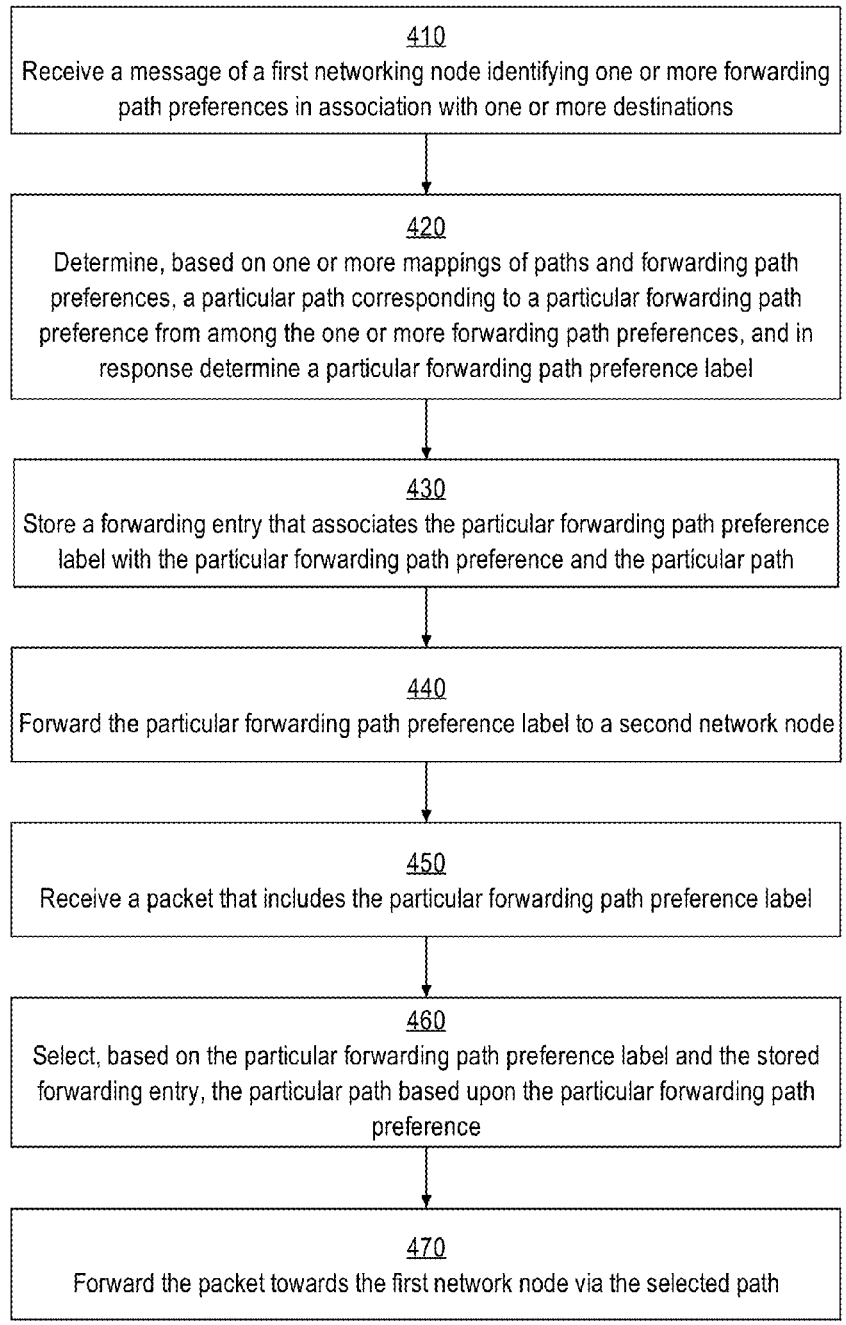
FIG. 4 illustrates a method of determining forwarding path preference labels and forwarding packets associated with forwarding path preference labels.

FIG. 4 illustrates an example method of determining forwarding path preference labels and forwarding packets associated with forwarding path preference labels. The steps of FIG. 4 may be performed at a single network node such as a packet router in a communications network that comprises at least an ingress network node, midpoint network node, an egress network node and a plurality of communications paths between the ingress network node and the egress network node.

In step 410, a message of a first network node identifying one or more forwarding path preferences in association with one or more destination addresses is received at a network node implementing remote path selection logic. In an embodiment, the message of the first network node may identify only the first network node's node address or prefix and the one or more forwarding path preferences may be determined based on one or more mappings of network node addresses or prefixes and forwarding path preferences.

In step 420, a particular path corresponding to a particular forwarding path preference from among the one or more forwarding path preferences is determined, based on one or more mappings of paths and forwarding path preferences, and in response a particular forwarding path preference label is determined. In an embodiment, the particular forwarding path preference label may specify the particular forwarding path preference within the label. In an embodiment, the identification of the particular forwarding path preference within the forwarding path preference label may be performed by extending the formats of existing base parameters of routing and label switching protocols to include information that identifies the particular forwarding path preference, such that the routing and label switching protocols will treat a label with the extended parameters as a distinct label from a label with the base parameters even when both labels are for the same destination address. For example, in a MPLS network, the address family parameter of the LDP may be extended to include information identifying a particular forwarding path preference. LDP will treat the label with the extended address family parameter as a distinct label from the label with the base address family parameter.

In an embodiment, the one or more mappings of paths and forwarding path preferences may be stored locally at the network node. In an embodiment, one or more paths may correspond to a particular forwarding path preference. In an embodiment, a particular path may be instantiated to correspond with the particular forwarding path preference, where the particular forwarding path preference does not match any forwarding path preferences that are in the one or more mappings of paths and forwarding path preferences. The instantiation of the particular path may be based on a forwarding path preference template associated with the particular forwarding path preference. In an embodiment, a particular default path may be associated with an unmatched forwarding path preference such that the process forwards a packet associated with the unmatched forwarding path preference via the particular default path.

In step 430, a forwarding entry associating the particular forwarding path preference label with the particular forwarding path preference and the particular path is stored. In an embodiment, in the forwarding entry, one or more paths may be associated with the particular forwarding path preference label and the particular forwarding path preference. The association of the forwarding path preference label with the forwarding path preference and the path in a forwarding entry will be according to the data plane architecture of the network node.

In step 440, the particular forwarding path preference label is forwarded to a second network node. In an embodiment, the second network node may be the ingress network node.

In step 450, a packet including the particular forwarding path preference label is received at the network node.

In step 460, the path associated with the particular forwarding path preference label is selected based on the particular forwarding path preference label, the stored forwarding entry and the particular forwarding path preference. In an embodiment, one or more paths may be associated with the forwarding path preference label in the forwarding entry and a load balancing policy, applied across all paths associated with the forwarding path preference label, may be used to select a path among the one or more paths.

In step 470, the packet is forwarded towards the first network node via the selected path.

Figure 5:
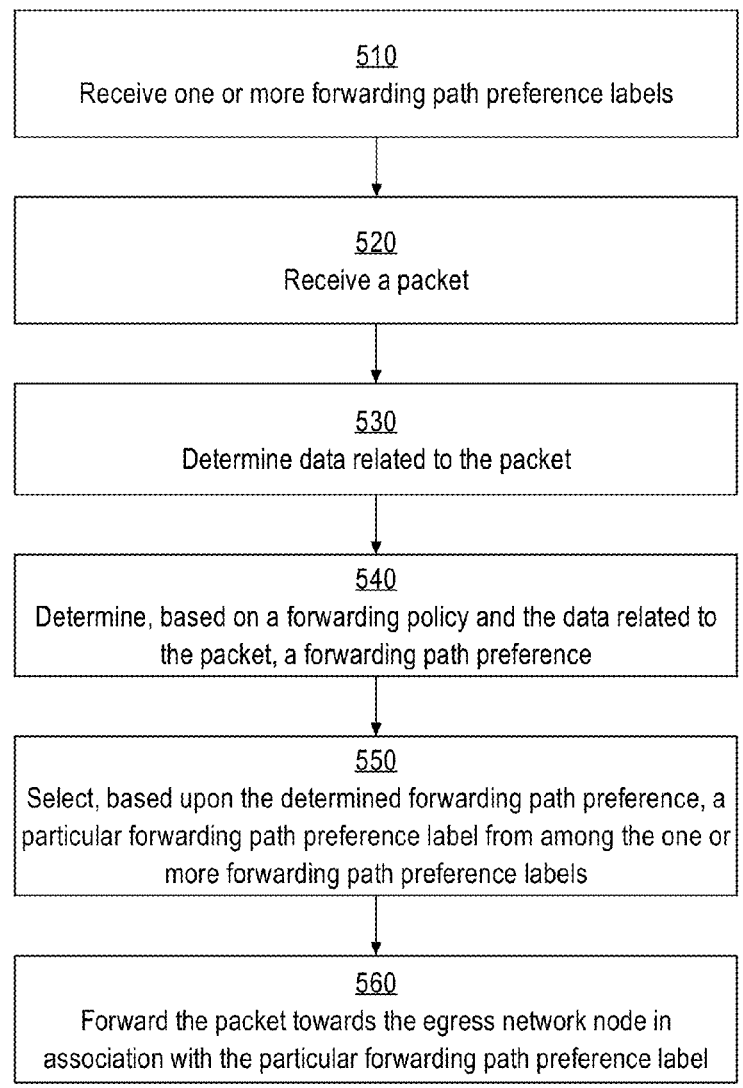
FIG. 5 illustrates a method of associating a packet with a forwarding path preference label.

FIG. 5 illustrates an example method of associating a packet with a forwarding path preference label. The steps of FIG. 5 may be performed at a single network node such as a packet router in a communications network that comprises at least an ingress network node, midpoint network node, an egress network node and a plurality of communications paths between the ingress network node and the egress network node.

In step 510, one or more forwarding path preference labels are received at a network node implementing remote path selection logic. In an embodiment, the network node implementing remote path selection logic may be an ingress network node. In step 520, a packet is received at the network node. In step 530, certain data related to the packet is determined. In an embodiment, where the forwarding policy is a data plane driven forwarding policy, the data that is determined may belong to one or more fields in the packet, such as source address or destination address of the packet, Differentiated services (DiffServ) code point in the packet header, a particular internet protocol of the packet or port at which the packet arrives at the network node. In an embodiment, the data that is determined may depend upon the particular forwarding policy associated with the network node. For example, the data that is determined may be the address family of the packet's destination address where the forwarding policy is a control plane driven forwarding policy and specifies a particular forwarding path preference based on the address family of the packet's destination address.

In step 540, a forwarding path preference is determined based on the forwarding policy associated with the network node and the data related to the packet.

In step 550, a particular forwarding path preference label is selected among the one or more forwarding path preference labels, based on the determined forwarding path preference.

In step 560, the packet is forwarded towards the egress network node in association with the particular forwarding path preference label. Therefore, the network node selects a remote path at a downstream network node based on an analysis of the forwarding policy associated with the network node. In an embodiment, the forwarding path preference label is associated with the packet according to the data plane architecture of the network node. For example, if the network node's data plane is a MPLS data plane, then the association of the forwarding path preference label with the packet will be similar to the way a non-forwarding path preference LDP label will be associated with the packet prior to the packet being forwarded to its next hop destination.

Figure 6:
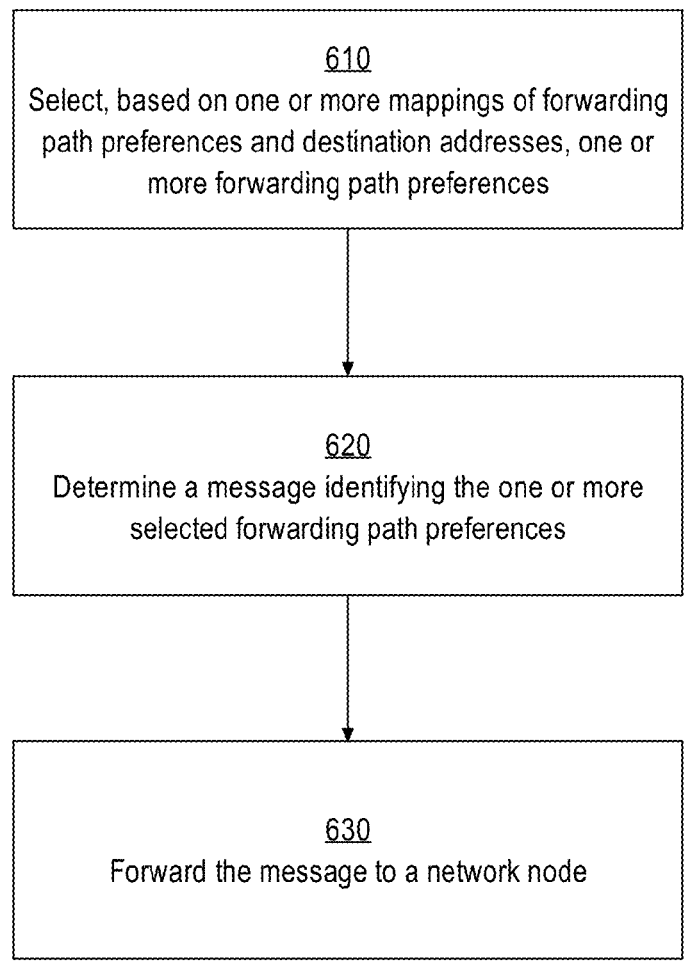
FIG. 6 illustrates a method of selecting one or more forwarding path preferences to be used for remote path selection.

FIG. 6 illustrates an example method of selecting one or more forwarding path preferences to be used for remote path selection logic. The steps of FIG. 6 may be performed at a single network node such as a packet router in a communications network that comprises at least an ingress network node, midpoint network node, an egress network node and a plurality of communications paths between the ingress network node and the egress network node.

In step 610, at a network node implementing remote path selection logic, one or more forwarding path preferences are selected based on one or more mappings of forwarding path preferences and destination addresses. In an embodiment, the destination addresses in the one or more mappings may represent network addresses of network nodes to which the network node implementing remote path selection logic is the egress network node. In an embodiment, a set of destination addresses in the one or more mappings may be represented by a prefix representing a set of network nodes to which the network node implementing remote path selection logic is an egress network node.

In step 620, a message identifying the one or more selected forwarding path preferences is determined. The particular format of the message and parameters identifying the forwarding path preferences depend upon the routing and label switching protocols used in the network.

In step 630, the message identifying the one or more selected forwarding path preferences is forwarded to a network node. In an embodiment, the message may be advertised throughout the network, such that when the message reaches a different network node implementing remote path selection logic, that network node may then follow the steps described in FIG. 4.

Therefore, the long-felt but unfulfilled need for an approach that provides both greater control and improved scalability in the network management field is now fulfilled.

4.0 Other Disclosure

The disclosure also encompasses the subject matter set forth in the following numbered clauses:

1. A computer-implemented method comprising: using a packet router in a communications network that comprises at least an ingress node, a midpoint node and an egress node, and a plurality of data communications paths between the ingress node and the egress node, receiving one or more labels from a network node, wherein each of the one or more labels is associated with a forwarding path preference; receiving a packet; determining data related to the packet; determining, based on a forwarding policy and the data, a forwarding path preference; selecting, based upon the determined forwarding path preference, a particular label from among the one or more labels; forwarding the packet towards the egress node in association with the particular label.

2. The computer-implemented method of clause 1, wherein the packet router is the ingress node.

3. The computer-implemented method of clause 1, wherein the network node is the midpoint node.

4. A packet router in a communications network that comprises at least an ingress node, a midpoint node and an egress node, and a plurality of communications paths between the ingress node and the egress node, comprising: one or more network interfaces that are configured to be coupled to a data network for receiving one or more packet flows therefrom; one or more processors; one or more stored sequence of instructions which, when executed by the one or more processors, cause the one or more processors to perform: receiving a packet; determining data related to the packet; determining, based on a forwarding policy and the data, a forwarding path preference; selecting, based upon the determined forwarding path preference, a particular label from among the one or more labels; forwarding the packet towards the egress node in association with the particular label.

5. The packet router recited in clause 4, wherein the packet router is the ingress node.

6. The packet router recited in clause 4, wherein the network node is the midpoint node.

7. A non-transitory computer-readable storage medium storing one or more sequences of instructions, which when executed by one or more processors, cause the one or more processors to perform: using a packet router in a communications network that comprises at least an ingress node, a midpoint node and an egress node, and a plurality of communications paths between the ingress node and the egress node, receiving a message of a first network node wherein the message identifies one or more forwarding path preferences in association with one or more destinations; determining, based on one or more mappings of paths and forwarding path preferences, a particular path corresponding to a particular forwarding path preference from among the one or more forwarding path preferences, and in response determining a particular label; storing a forwarding entry that associates the particular label with the particular forwarding path preference and the particular path; forwarding, to a second network node, the particular label; receiving a packet that includes the particular label; selecting, based on the particular label and the stored forwarding entry, the particular path based upon the particular forwarding path preference; forwarding the packet towards the first network node via the particular path.

8. The non-transitory computer-readable storage medium of clause 7, further comprising: identifying a prefix included in the message; determining, based on one or more mappings of forwarding path preferences and prefixes, the particular forwarding path preference based on using the one or more mappings and the prefix.

9. The non-transitory computer-readable storage medium of clause 7, further comprising: selecting, based on the particular label and the stored forwarding entry, the particular path based upon the particular forwarding path preference and using one or more mappings of paths and forwarding path preferences and a forwarding policy associated with the packet router.

10. The non-transitory computer-readable storage medium of clause 7, further comprising: determining the particular forwarding path preference matches a stored forwarding path preference that is in one or more mappings of paths and forwarding path preferences, and in response, determining the particular label for the particular forwarding path preference.

11. The non-transitory computer-readable storage medium of clause 7, further comprising: determining that the particular forwarding path preference does not match any forwarding path preferences that are in one or more mappings of paths and forwarding path preferences; instantiating, based on a path template associated with the particular forwarding path preference, the path corresponding to the particular forwarding path preference.

12. The non-transitory computer-readable storage medium of clause 7, comprising associating, in the forwarding entry, the particular label with both a first path and a second path; selecting, based on the particular label, the forwarding entry and a load balancing policy, either the first path or the second path; forwarding the packet towards the first network node via the selected path.

13. The non-transitory computer-readable storage medium of clause 7, further comprising: determining that the particular forwarding path preference does not match any forwarding path preferences that are in one or more mappings of paths and forwarding path preferences; in response to determining that the particular forwarding path preference does not match any forwarding path preferences present in the mappings of paths and forwarding path preferences, associating a default path with the particular forwarding path preference; determining a default label for the particular forwarding path preference; storing the forwarding entry that associates the default label with the particular forwarding path preference and the default path; forwarding, to the second network node, the default label; receiving the packet including the default label; selecting, based on the default label and the stored forwarding entry, the default path based upon the particular forwarding path preference; forwarding the packet towards the first network node via the default path.

14. The non-transitory computer-readable storage medium of clause 7, wherein the label includes a node address comprising the particular forwarding path preference.

15. The non-transitory computer-readable storage medium of clause 7, wherein the first network node is the egress node and the second network node is the ingress node.

16. The non-transitory computer-readable storage medium of clause 7, wherein the one or more paths comprise any of traffic engineered tunnels, generic routing encapsulation tunnels, or interior gateway protocol paths.

17. The non-transitory computer-readable storage medium of clause 7, wherein each of the first network node and the second network node is a provider edge (PE) router.

18. The non-transitory computer-readable storage medium of clause 7, wherein the message is any of a Label Distribution Protocol message, a Border Gateway Protocol message, an ISIS advertisement or an OSPF advertisement.

19. A non-transitory computer-readable storage medium storing one or more sequences of instructions, which when executed by one or more processors, cause the one or more processors to perform: using a packet router in a communications network that comprises at least an ingress node, a midpoint node and an egress node, and a plurality of data communications paths between the ingress node and the egress node, receiving one or more labels from a network node, wherein each of the one or more labels is associated with a forwarding path preference; receiving a packet; determining data related to the packet; determining, based on a forwarding policy and the data, a forwarding path preference; selecting, based upon the determined forwarding path preference, a particular label from among the one or more labels; forwarding the packet towards the egress node in association with the particular label.

20. The computer-implemented method of clause 19, wherein the packet router is the ingress node.

21. The computer-implemented method of clause 19, wherein the network node is the midpoint node.

5.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
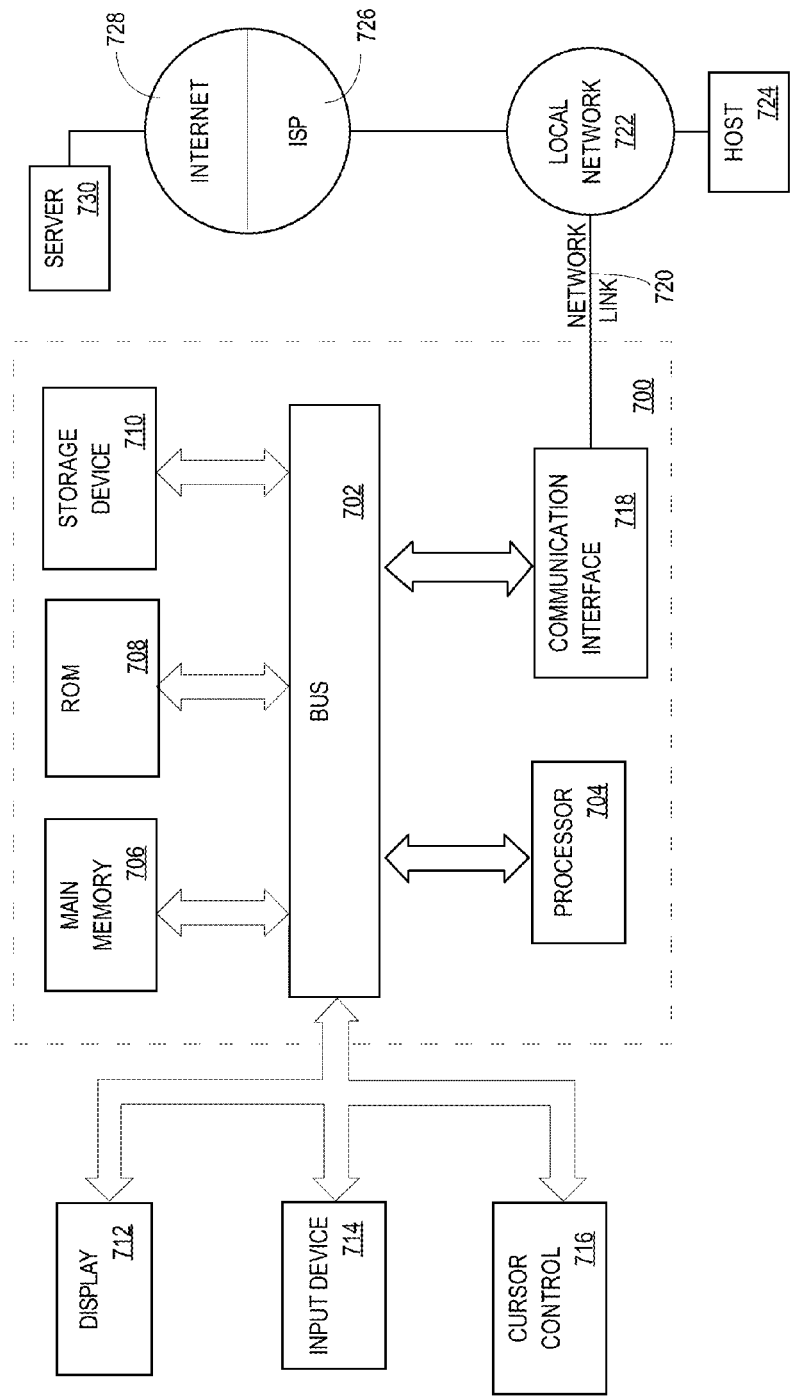
FIG. 7 illustrates a computer system upon which an embodiment may be implemented.

For example, FIG. 7 is a block diagram that illustrates a computer system 700 upon which an embodiment of the disclosure may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

5.0 Extensions and Alternatives

In the foregoing specification, embodiments of the disclosure have been described with reference to numerous specific details that may vary from implementation to implementation. Thus, the sole and exclusive indicator of what is the disclosure, and is intended by the applicants to be the disclosure, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   using a packet router in a communications network that comprises at least an ingress network node, a midpoint network node and an egress network node, and a plurality of communications paths between the ingress network node and the network egress node:
   maintaining, at the midpoint network node, one or more mappings of forwarding path preferences and paths, wherein each forwarding path preference is a unique identifier corresponding to one or more traffic engineered paths of the plurality of communication paths;
   receiving, from the egress network node at the midpoint network node, a message identifying two or more forwarding path preferences in association with one or more destinations;
   at the midpoint network node, for each forwarding path preference of the two or more forwarding path preferences received:
      determining, from the one or more mappings, whether one or more paths from the midpoint network node to the egress network node correspond to the forwarding path preference;
      in response to determining one or more paths from the midpoint network node to the egress network node correspond to the forwarding path preference, generating a forwarding path preference label;
      storing a forwarding entry that associates the forwarding path preference label with the forwarding path preference and the one or more paths from the midpoint network node to the egress network node;
      forwarding, to the ingress network node, the forwarding path preference label;
   receiving, at the ingress network node, a packet;
   selecting, at the ingress network node, a particular forwarding path preference corresponding to two or more forwarding path preference labels received from the midpoint network node, and associating with the packet a particular forwarding path preference label corresponding to the particular forwarding path preference;
   receiving, at the midpoint network node from the ingress network node, the packet associated, by the ingress network node, with the particular forwarding path preference label;
   selecting, based on the particular forwarding path preference label and the particular forwarding path preference corresponding to the stored forwarding entry, a particular path from the one or more paths from the midpoint network node to the egress network node; and
   forwarding the packet towards the egress network node via the particular path.

2. The computer-implemented method of claim 1, further comprising:
   identifying a prefix included in the message;
   determining, based on one or more mappings of forwarding path preferences and prefixes, each forwarding path preference based on using the one or more mappings and the prefix.

3. The computer-implemented method of claim 1, wherein selecting the particular forwarding path preference is based on a forwarding policy associated with the packet router and packet data.

4. The computer-implemented method of claim 1, further comprising:
   determining the forwarding path preference matches a stored forwarding path preference that is in the one or more mappings, and in response, generating the forwarding path preference label for the forwarding path preference.

5. The computer-implemented method of claim 1, further comprising:
   determining that the forwarding path preference does not match any forwarding path preferences that are in the one or more mappings;
   instantiating, based on a path template associated with the forwarding path preference, a path corresponding to the forwarding path preference.

6. The computer-implemented method of claim 1, wherein the particular forwarding path preference is associated with a group of at least two paths and selecting the particular path is based on the particular forwarding path preference label, the forwarding entry and a load balancing policy.

7. The computer-implemented method of claim 1, further comprising:
   determining that the forwarding path preference does not match any forwarding path preferences that are in the one or more mappings;
   in response to determining that the forwarding path preference does not match any forwarding path preferences present in the one or more mappings, associating a default path with the forwarding path preference;
   determining a default forwarding path preference label for the forwarding path preference;
   storing the forwarding entry that associates the default forwarding path preference label with the forwarding path preference and the default path;
   forwarding, to the ingress network node, the default forwarding path preference label;
   selecting, at the ingress network node, a particular forwarding path preference associated with a default forwarding path preference label, and associating with the packet the default forwarding path preference label;
   receiving, at the midpoint network node from the ingress network node, the packet associated, by the ingress network node, with the default forwarding path preference label;
   selecting, based on the default forwarding path preference label and the particular forwarding path preference corresponding to the stored forwarding entry, the default path;
   forwarding the packet towards the egress network node via the default path.

8. The computer-implemented method of claim 1, wherein the forwarding path preference label includes a node address comprising the forwarding path preference.

9. The computer-implemented method of claim 1, wherein each of the egress network node and the ingress network node is a provider edge (PE) router.

10. The computer-implemented method of claim 1, wherein the one or more paths comprise any of traffic engineered tunnels, generic routing encapsulation tunnels, or interior gateway protocol paths;
   wherein the message is any of a Label Distribution Protocol message, a Border Gateway Protocol message, an ISIS advertisement or an OSPF advertisement.

11. A packet router in a communications network that comprises at least an ingress network node, a midpoint network node and an egress network node, and a plurality of communications paths between the ingress network node and the egress network node, comprising:
   one or more network interfaces that are configured to be coupled to a data network for receiving one or more packet flows therefrom;
   one or more processors;
   one or more non-transitory computer-readable media storing instructions which, when executed by the one or more processors, cause the one or more processors to perform:
   maintaining, at the midpoint network node, one or more mappings of forwarding path preferences and paths, wherein each forwarding path preference is a unique identifier corresponding to one or more traffic engineered paths of the plurality of communication paths;
   receiving, from the egress network node at the midpoint network node, a message identifying two or more forwarding path preferences in association with one or more destinations;
   at the midpoint network node, for each forwarding path preference of the two or more forwarding path preferences received:
   determining, from the one or more mappings, whether one or more paths from the midpoint network node to the egress network node correspond to the forwarding path preference;
   in response to determining one or more paths from the midpoint network node to the egress network node correspond to the forwarding path preference, generating a forwarding path preference label;
   storing a forwarding entry that associates the forwarding path preference label with the forwarding path preference and the one or more paths from the midpoint network node to the egress network node;
   forwarding, to the ingress network node, the forwarding path preference label;
   receiving, at the ingress network node, a packet;
   selecting, at the ingress network node, a particular forwarding path preference corresponding to two or more forwarding path preference labels received from the midpoint network node, and associating with the packet a particular forwarding path preference label corresponding to the particular forwarding path preference;
   receiving, at the midpoint network node from the ingress network node, the packet associated, by the ingress network node, with the particular forwarding path preference label;
   selecting, based on the particular forwarding path preference label and the particular forwarding path preference corresponding to the stored forwarding entry, a particular path from the one or more paths from the midpoint network node to the egress network node; and
   forwarding the packet towards the egress network node via the particular path.

12. The packet router recited in claim 11, further comprising:
   identifying a prefix included in the message;
   determining, based on one or more mappings of forwarding path preferences and prefixes, each forwarding path preference based on using the one or more mappings and the prefix.

13. The packet router recited in claim 11,
   wherein selecting the particular forwarding path preference is based on a forwarding policy associated with the packet router and packet data.

14. The packet router recited in claim 11, further comprising:
   determining the forwarding path preference matches a stored forwarding path preference that is in the one or more mappings, and in response, generating the forwarding path preference label for the particular forwarding path preference.

15. The packet router recited in claim 11, further comprising:
   determining that the forwarding path preference does not match any forwarding path preferences that are in the one or more mappings;
   instantiating, based on a path template associated with the forwarding path preference, a path corresponding to the forwarding path preference.

16. The packet router recited in claim 11,
   wherein the particular forwarding path preference is associated with a group of at least two paths and selecting the particular path is based on the particular forwarding path preference label, the forwarding entry and a load balancing policy.

17. The packet router recited in claim 11, further comprising:
   determining that the forwarding path preference does not match any forwarding path preferences that are in the one or more mappings;
   in response to determining that the forwarding path preference does not match any forwarding path preferences present in the one or more mappings, associating a default path with the forwarding path preference;
   determining a default forwarding path preference label for the forwarding path preference;
   storing the forwarding entry that associates the default forwarding path preference label with the forwarding path preference and the default path;
   forwarding, to the ingress network node, the default forwarding path preference label;
   selecting, at the ingress network node, a particular forwarding path preference associated with a default forwarding path preference label, and associating with the packet the default forwarding path preference label;
   receiving, at the midpoint network node from the ingress network node, the packet associated, by the ingress network node, with the default forwarding path preference label;
   selecting, based on the default forwarding path preference label and the particular forwarding path preference corresponding to the stored forwarding entry, the default path;
   forwarding the packet towards the egress network node via the default path.

18. The packet router recited in claim 11, wherein the forwarding path preference label includes a node address comprising the forwarding path preference.

19. The packet router recited in claim 11, wherein each of the egress network node and the ingress network node is a provider edge (PE) router.

20. The packet router recited in claim 11, wherein the one or more paths comprise any of traffic engineered tunnels, generic routing encapsulation tunnels, or interior gateway protocol paths;
   wherein the message is any of a Label Distribution Protocol message, a Border Gateway Protocol message, an ISIS advertisement or an OSPF advertisement.

* * * * *